July 30, 1940.  J. I. LEVINE  2,209,780
DIRECTION OF TURN SIGNAL DEVICE
Filed Feb. 11, 1938
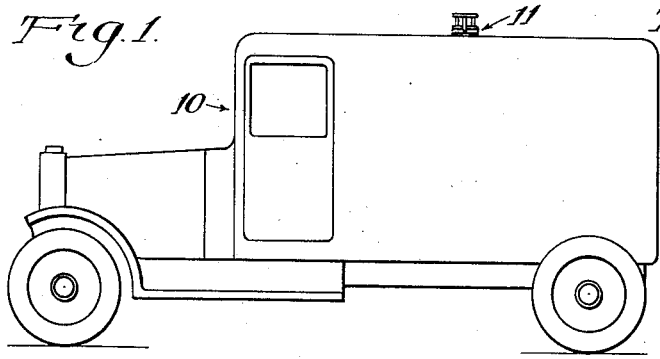
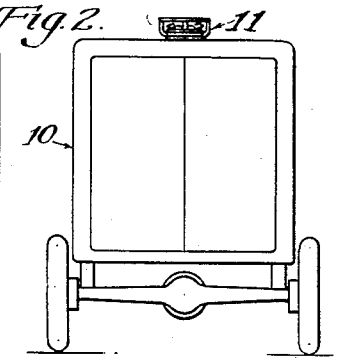
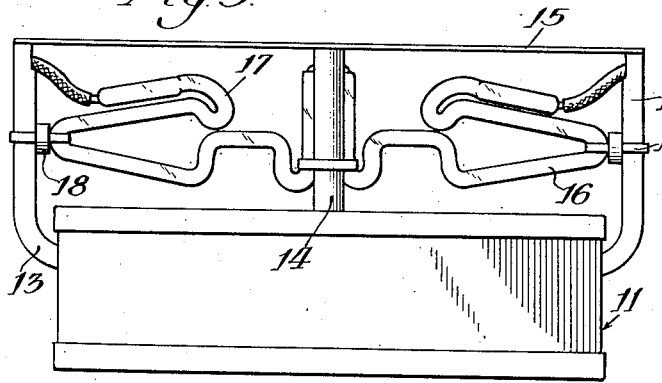
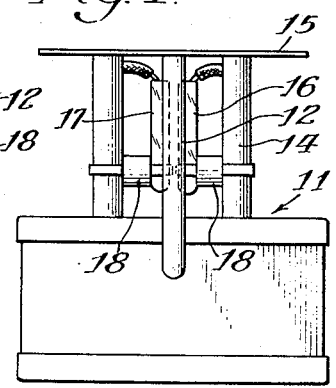
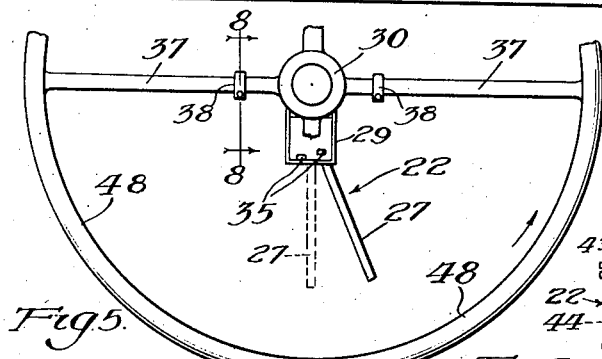
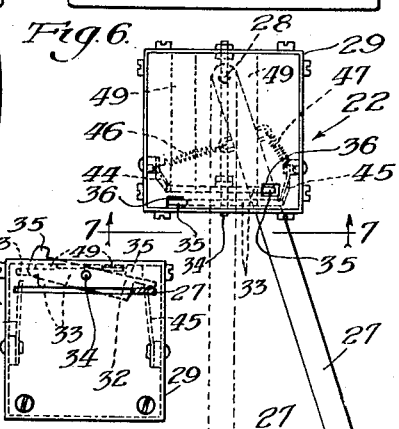
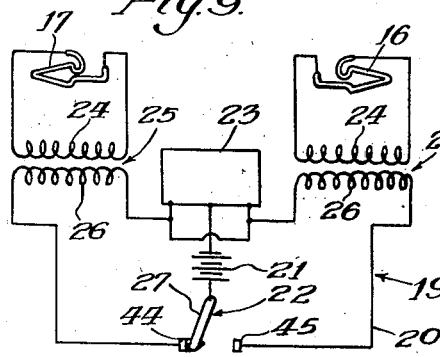
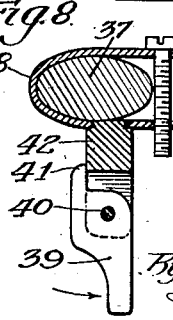
Inventor:
James I. Levine
By
Bell, Wallace & Cannon
Attorneys Patented July 30, 1940

2,209,780

UNITED STATES PATENT OFFICE 2,209,780

DIRECTION OF TURN SIGNAL DEVICE

James I. Levine, Chicago, Ill.

Application February 11, 1938, Serial No. 189,975

2 Claims. (Cl. 200—59)

This invention relates to direction of turn signals for automotive vehicles such as trucks and the like.

I am aware of the fact that heretofore in the art various direction of turn signal devices for automotive vehicles, including trucks, have been provided and among these are devices in which so-called neon or luminous tube signals and the like have been used. However, difficulties have been experienced in the use of so-called neon or luminous tube direction of turn signals for automotive vehicles and among these is the fact that such signals require a high voltage alternating current for their operation, and the customary practice of using such devices has been to incorporate the so-called neon or luminous tube signals in the high voltage or secondary side of the circuits embodied in such devices and this practice has been the source of much trouble in the use of such devices, and has prevented their general adoption, particularly by reason of the fact that the arrangement of the so-called neon or luminous tube signals in the high voltage or secondary side of such circuits has been the cause of arcing and consequent burning out of the wires, thus destroying the device and its utility.

Accordingly, an object of the present invention is to provide a direction of turn signal device which is especially adapted for use on automotive vehicles, and especially trucks, and which overcomes arcing and the other difficulties which have been experienced in the use of the prior art devices.

Another object of the present invention is to provide a new and improved direction of turn signal device which is especially adapted for use on automotive vehicle trucks and which is so designed and constructed that when the device is in position of use on a truck the signals may be seen from any and all directions.

An additional object of the invention is to provide in, and as a part of the new device, a new and improved switch and switch-operating mechanism which is intended for association with, and for operation by, the steering wheel of a truck or like automotive vehicle.

Other objects will appear hereinafter.

The invention consists in the novel combination and arrangement of parts to be hereinafter described and claimed.

The invention will be best understood by reference to the accompanying drawing showing the preferred form of construction and in which:

Fig. 1 is a side elevational view of a truck showing one of the new devices in position of use thereon and showing the location or position of the signals and certain other parts of the device relative to the front and rear ends of the truck;

Fig. 2 is a rear elevational view of the truck shown in Fig. 1 and illustrating the position of the signals and certain other parts of the device thereon, relative to the sides of the truck;

Fig. 3 is a side elevational view of a preferred form of the signals and certain other parts of the new device and which are shown in position of use in Figs. 1 and 2;

Fig. 4 is an end elevational view of those parts of the device which are shown in Fig. 3;

Fig. 5 is a fragmentary top plan view of the steering wheel of a truck and showing certain parts of the switch and switch-operating mechanism of the present invention associated therewith;

Fig. 6 is a top plan view of certain parts of the switch and switch-operating mechanism which are embodied in the present invention;

Fig. 7 is a view on line 7—7 in Fig. 6, partly in section and partly in elevation, showing parts of the latching mechanism for the switch-operating arm;

Fig. 8 is a transverse sectional detail view on line 8—8 in Fig. 5, and showing one of the trips or releases for the latching mechanism of the switch-operating arm; and Fig. 9 is a schematic view or wiring diagram of the electrical circuit which is embodied in the present invention.

A preferred form of the new direction of turn signal device is shown in the drawing, and is therein shown as being associated with a truck or similar automotive vehicle 10, and comprises a housing 11 which is preferably, but not necessarily, mounted on the top of the truck midway between the sides and the front and rear ends thereof, for a reason which will appear hereinafter.

Mounted on the housing 11, and projecting upwardly therefrom at the ends thereof, and attached thereto in any suitable manner, are supporting arms 12 and 13, and also mounted on the housing 11, approximately midway between the ends thereof, is a support 14, and extending over the housing 11, and carried by the supports 12, 13 and 14 is a plate or shield 15, the function of which will be described hereinafter.

Suspended above the housing 11, between the supports 12 and 14, and below the plate or shield 15, is a direction of turn signal in the form of a so-called neon or luminous tube 16 having the shape of an arrow indicating a right turn, and a similar, but oppositely directed, or left turn signal 17 is arranged between the uprights 13 and 14, these signal tubes being attached to and insulated from the supports 12—14 and 13—14 by means of rubber or other suitable insulating attaching elements 18.

The right and left turn signal devices or tubes 16 and 17, respectively, are arranged in the high voltage or secondary side of an electrical circuit which is illustrated diagrammatically in Fig. 9, and is therein generally indicated at 19; said circuit being arranged in the housing 11.

The circuit 19 includes a primary or low voltage side 20 which is connected to a suitable source of low voltage current such as a 6V. battery 21 of the truck or other vehicle 10, and arranged in this primary or low voltage side 20 of the circuit 19 is a manually operable control switch which is generally indicated at 22 and which may be of any desired and suitable construction, although it is preferably of the construction which is shown in Figs. 5, 6, 7 and 8, and which will be referred to hereinafter; said switch being shown as being associated with the steering wheel 48 of the vehicle or truck 10.

The circuit 19 also includes a vibrator 23, of conventional design, which is arranged therein in the manner illustrated in Fig. 9, the vibrator 23 being illustrated as being connected to the primary side or low voltage windings 26 of the step-up transformers 25, which, in turn, are electrically connected to the direction of turn signals 16 and 17; the primary windings 26 of these transformers 25 being electrically connected to opposite sides of fixed or stationary contacts 44 and 45 of the switch 22 and between and selectively engageable with which the movable element 27 is arranged.

The movable element 27 of the switch 22 is pivotally mounted, as at 28, in a housing 29 which may be attached to, or mounted on, the steering column 30 of the vehicle 10, in any suitable manner, and the manually operable switch arm 27 is held in its normal or ineffective position as at A, Fig. 6, by means of springs 46 and 47 (Fig. 6).

The operating mechanism for the switch 22 includes a pair of spring-urged latch members 33, each of which is pivotally mounted, between its ends, as at 34, in the housing 29 (Fig. 7), each of these latch members 33 having a finger grip or trip portion 35 which is adapted to project, when the latch member is in unlatched or ineffective position, through an opening 36 which is formed in the wall of the housing 29. Each of the latch members 33 has a notched or latching end portion 32—43 and the notched or latching end portion 32—43 of each of these latch members 33 is normally urged into effective, or latching position (as in full lines, Fig. 7), by means of a flat leaf spring 49, these springs 49 being mounted in the housing 29 and on the wall of the same.

Mounted, one on each of two spokes 37 of the steering wheel 48 which are spaced 180° apart, and by means of suitable brackets or clips 38, are two latch-releasing trip members 39, each of which is pivotally mounted between its ends, as at 40, on an extension 42 of the corresponding bracket 38, each of these trip members 39 being movable in only one direction (counterlockwise, in the direction of the arrow, Fig. 8), and being prevented from movement in the opposite direction by engagement of a stop portion 41 thereof with the extension or arm 42 of the corresponding bracket 38, for reasons to be explained hereinafter.

Operation

In the use of the new direction of turn signal device the same is mounted in position of use, as shown, and the circuit-closing member or switch arm 27 is normally held midway between the fixed contact 45 and 46 of the switch 22, by means of the springs 46 and 47, thus keeping the primary or low voltage side 20 of the circuit 19 normally open.

Accordingly, if the driver of the vehicle on which the new device of turn signal device is mounted intends to make, for example, a right turn he then manually moves the circuit closing member or switch arm 27 (counterclockwise, Fig. 6) into position, and into engagement with the fixed or stationary contact 45, thereby closing the primary or low voltage side 20, of the circuit 19, to the right turn indicating signal or arrow 16, whereupon a high voltage, high frequency, alternating current will be caused, by the vibrator 23, and the corresponding or right hand transformer 25, to flow through the so-called neon or luminous tube 16, thus indicating that the driver intends to make a right turn, and the switch arm or circuit-closing member 27 will, of course, be moved in the opposite direction if the driver intends to make a left turn, thereby illuminating the so-called neon or luminous tube arrow 17.

It will be noted that when the switch arm or circuit-closing member 27 is moved into position to close circuit to either one or the other of the signal tubes 16 and 17, and thus indicate either a right or a left turn, it rides over or cams against the edge of the corresponding latch member 33, the said latch member being urged into engagement with the switch arm or circuit-closing member 27 by the corresponding flat leaf spring 49, thereby causing the said latch member 33 to pivot, at 34 (clockwise, into the position in which it is shown in Fig. 7). This movement of the latch member 33 causes the upper end portion 35 of the same to project through the corresponding opening 36 in the wall 29 of the housing 22 and at the same time engages the notched portion 43 thereof with the switch arm 27, thus latchingly engaging the switch arm or circuit-closing member 27 in the notched end portion 43 of the latch member 33. At this time the flat spring contact 44 or 45 (Fig. 7) which is engaged by the switch arm 27 functions not only as a contact but also as a spring to urge the switch arm 27 into the notched portion 43 of the corresponding latch member 33. Hence the said switch arm or circuit-closing member 27 is held in circuit-closing position and against movement, that is, against return to its initial position until the driver completes the right turn, which he is assumed to be making in this example, brings the vehicle back into forward position, during which operation one of the trip members 39 engages the upwardly projecting head or cam portion 35 of the corresponding latch member 33, and rides over the same, thereby depressing the said latch member 33. The tensioned spring 46 will thereupon return the switch arm 27 to its initial position, (as at A, Fig. 6), and during this return movement of the switch arm or circuit-closing member 27 the same again rides over or cams against the edge 32 of the latch member 33, thus returning the latter to its initial position and retracting the head 35 thereof out of the corresponding hole or opening in the wall 29 of the housing 22, while at the same time tensioning the corresponding spring 49.

It will also be noted, in this connection, however, by reference to the drawing, that the latch-releasing trip arms 39 are capable of movement in only one direction, that is, counterclockwise, as seen in Fig. 8, so that when the steering wheel 48 is being moved to complete a right turn, as in the foregoing example, the lower end portion of the corresponding latch-releasing member or trip 39 will engage the upwardly projecting end or cam portion 35 of the corresponding latch member 33, thereby pivoting the said latch-releasing trip member 39, at 40 (counterclockwise, Fig. 8), and thus allowing the said trip or latch-releasing trip member 39 to pass over the upwardly projecting end or cam portion 35 of the latch member 33 during the operation of making the turn. However, as stated above, during the return movement of the wheel, that is, into straight ahead or forward position, after making the turn referred to in the foregoing example, the trip or latch-releasing member 39 will engage the upwardly projecting head 35 of the corresponding latch member and thus return the latter back into its normal or ineffective position, in the manner described above.

It will also be noted, in connection with the present invention, that the control switch 22 is arranged in the primary or low voltage side of the circuit 20, rather than in the high voltage or secondary side of the circuit, as has been the customary practice heretofore in the prior art devices, and that there are no breaks or interruptions of any kind in the high voltage or secondary side of the circuit, and hence the difficulty which has, heretofore, been experienced in the use of the prior art devices which have employed so-called neon or luminous tubes, namely, arcing in the high voltage side of the circuit, and consequent burning out and destruction of the wires, etc., is eliminated and overcome.

It will further be noted, by reference to the drawing, that the present apparatus provides a direction of turn signal, or rather, a pair of such signals, which may be readily seen, when mounted in the position of use which is shown in Figs. 1 and 2, from either the front or rear of the vehicle, as well as from either or both sides thereof, by reason of the fact that the so-called neon or luminous signals 16—17 are exposed to an unobstructed view between the housing 11 and the wall 15 which acts as shield to prevent light from dimming or obscuring the signals 16—17 as, for example, by snow, when the vehicle on which the new device is used is passing through vehicular tunnels, under bridges, etc., or through other places in which there is overhead illumination.

It will likewise be noted, from the foregoing description, taken in conjunction with the accompanying drawing, that the present invention is positive and fool-proof in operation, in that, once the switch arm or circuit-closing member 27 is moved into position to close the switch 22 it remains closed and is latched against movement, and the corresponding signal 16 or 17 remains illuminated, until the driver has completed the turn and the vehicle has again resumed a straight ahead position, thus preventing any possibility of the switch 22 being opened, and the corresponding signal extinguished, during the operation of making the turn.

It will thus be seen, from the foregoing description, taken in conjunction with the drawing, that the present invention accomplishes its intended objects, which have been recited, hereinbefore, and overcomes those difficulties heretofore experienced in the use of the prior art devices which have been pointed out hereinbefore.

While I have illustrated and described preferred forms of construction for carrying my invention into effect, these are capable of variation and modification, without departing from the spirit of the invention. I, therefore, do not wish to be limited to the precised details of construction set forth, but desire to avail myself of such variations and modifications as come within the scope of the appended claims.

I claim:

1. In a control switch for a direction turn signal device for automotive vehicles, a trip member adapted to be secured to the steering wheel of the vehicle and movable therewith, a housing positioned below the plane of operation of the wheel and having a wall extending substantially parallel to and spaced from said plane, there being a pair of apertures in said wall, a pair of latch members each having a trip portion and each being pivoted in the housing for tilting movement from a position wherein the trip portion thereof is retracted within the housing to a position wherein the trip portion is projected through one of the openings and into the path of movement of the trip member, a switch arm pivoted within the housing and projecting therefrom and cooperating with the latch members, a signal switch operatively connected to the switch arm, and means normally urging said switch arm to a position wherein it is disengaged by said latch members to positions wherein it is releasably engaged and held by the latch members in respective positions, said trip member being adapted upon turning of the wheel to engage the projecting trip portions of said latch members to retract the same.

2. In a control switch for a direction turn signal device for automotive vehicles, a pair of trip members adapted to be secured to the steering wheel of the vehicle and movable therewith, a housing positioned below the plane of operation of the wheel and having a wall extending substantially parallel to and spaced from said plane, there being a pair of apertures in said wall, a pair of latch members each having a trip portion and each being pivoted in the housing for tilting movement from a position wherein the trip portion thereof is retracted within the housing to a position wherein the trip portion is projected through one of the openings and into the path of movement of the trip members, a switch arm pivoted within the housing and projecting therefrom and cooperating with the latch members, a signal switch operatively connected to the switch arm, and means normally urging said switch arm to a position wherein it is disengaged by said latch members to positions wherein it is releasably engaged and held by the latch members in respective positions, said trip members each including a pivoted pawl adapted to ride over the trip portion of the latch members in one direction and to operatively engage and retract the same in the other direction.

JAMES I. LEVINE.